United States Patent [19]

Iizuka et al.

[11] Patent Number: 4,931,516
[45] Date of Patent: Jun. 5, 1990

[54] PROCESS FOR PRODUCING POLYARYLENE SULFIDE IN TITANIUM VESSEL WITH ADDITION OF WATER

[75] Inventors: Yo Iizuka; Takao Iwasaki; Takayuki Katto; Zenya Shiiki, all of Iwaki, Japan

[73] Assignee: Kureha Kagaku Kogyo Kabushiki Kaisha, Tokyo, Japan

[21] Appl. No.: 300,938

[22] Filed: Jan. 24, 1989

Related U.S. Application Data

[62] Division of Ser. No. 79,999, Jul. 31, 1987, Pat. No. 4,812,539.

[30] Foreign Application Priority Data

Aug. 4, 1986 [JP] Japan ................................ 61-182989

[51] Int. Cl.$^5$ .............................................. C08G 75/16
[52] U.S. Cl. ........................................ 526/62; 528/86; 528/206; 528/226; 528/388
[58] Field of Search .................... 526/62; 528/86, 206, 528/226, 388

[56] References Cited

U.S. PATENT DOCUMENTS

| | | | |
|---|---|---|---|
| 2,532,369 | 12/1950 | Patrick et al. | 260/608 |
| 2,986,582 | 5/1961 | Martin et al. | 260/609 |
| 3,248,325 | 4/1966 | Graham | 252/33.6 |
| 3,268,504 | 8/1966 | Harris et al. | 260/125 |
| 3,409,594 | 11/1969 | Slovinsky | 260/67 |
| 3,524,835 | 8/1970 | Edmonds et al. | 260/79.1 |
| 3,607,843 | 9/1971 | Vidaurri, Jr. | 260/79 |
| 3,717,620 | 2/1973 | Rohlfing | 260/79 |
| 3,763,124 | 10/1973 | Edmonds, Jr. | 260/79.1 |
| 3,786,035 | 1/1974 | Scoggin | 260/79.1 |
| 3,790,536 | 2/1974 | Vidaurri, Jr. | 260/79.1 |
| 3,868,352 | 2/1975 | Rich | 260/78 |
| 4,038,259 | 7/1977 | Campbell | 260/79.1 |
| 4,038,260 | 7/1977 | Campbell | 260/79.1 |
| 4,038,261 | 7/1977 | Grouch et al. | 260/79.1 |
| 4,038,262 | 7/1977 | Edmonds | 260/79.1 |
| 4,038,263 | 7/1977 | Edmonds, Jr. et al. | 260/79.1 |
| 4,039,518 | 8/1977 | Campbell | 260/79.1 |
| 4,282,347 | 8/1981 | Tieszen et al. | 528/388 |
| 4,331,801 | 5/1982 | Idel et al. | 528/388 |
| 4,362,864 | 12/1982 | Idel et al. | 528/388 |
| 4,368,321 | 1/1983 | Sherk et al. | 528/388 |
| 4,415,729 | 11/1983 | Scoggins et al. | 528/388 |
| 4,510,297 | 4/1985 | Moberly | 525/537 |
| 4,524,200 | 6/1985 | Sherk | 528/388 |
| 4,537,953 | 8/1985 | Kawakami et al. | 528/388 |
| 4,812,539 | 3/1989 | Iizuka et al. | 528/388 |

*Primary Examiner*—Harold D. Anderson
*Attorney, Agent, or Firm*—Oblon, Spivak, McClelland, Maier & Neustadt

[57] ABSTRACT

Disclosed herein is a process for producing a medium- or high-molecular-weight polyarylene sulfide which comprises subjecting an alkali metal sulfide, a dihalo aromatic compound and optionally, small amount of tri- or higher polyhalo aromatic compound to dehalogenation and sulfidation reaction at a temperature of from 240° to 270° C. in the presence of a water in amount of from 0.5 to 5 mol per 1 kg of an aprotic organic polar solvent until the conversion of said dihalo aromatic compound reaches from 70 to 98 mol %, thereby forming a polyarylene sulfide prepolymer having a melt viscosity of from 5 to 300 poise (as measured at 310° C. under a shear rate of 200 sec$^{-1}$), adding water to the resultant reaction mixture containing the polyarylene sulfide prepolymer so that from 6 to 15 mol of water is present per 1 kg of said solvent, and then continuing the reaction at a temperature of from 240°–290° C., in which the reaction comprising said two steps is conducted for from 2 to 6 hours.

3 Claims, No Drawings

PROCESS FOR PRODUCING POLYARYLENE SULFIDE IN TITANIUM VESSEL WITH ADDITION OF WATER

This is a division of application Ser. No. 079,999, filed July 31, 1987, now U.S. Pat. No. 4,812,539.

BACKGROUND OF THE INVENTION

The present invention relates to a process for producing a polyarylene sulfide (hereinafter referred to as PAS) and, particularly, the present invention relates to a process for producing a medium- or high-molecular-weight PAS within a short time period without using a polymerization aid such as an organic acid salt.

More in detail, the present invention relates to (1) a process for producing a medium-molecular-weight PAS which comprises the steps of subjecting an alkali metal sulfide and a dihalo aromatic compound to dehalogenation and sulfidation reaction at a temperature of from 240°–270° C. in the presence of a water in amount of from 0.5 to 5 mol per 1 kg of an aprotic organic polar solvent until the conversion of the dihalo aromatic compound reaches from 70 to 98 mol %, thereby forming a PAS prepolymer having a melt viscosity of from 5 to 300 poise (as measured at 310° C. under a shear rate of 200 sec$^{-1}$), adding water to the resultant reaction mixture containing the PAS prepolymer so that from 6 to 15 mol of water is present per 1 kg of the solvent, and then continuing the reaction at a temperature of from 240°–290° C., in which the reaction comprising the said two steps is conducted for 1 to 10 hours, and (2) a process for producing a high-molecular-weight PAS which comprises the steps of subjecting an alkali metal sulfide, a dihalo aromatic compound and a tri- or higher polyhalo aromatic compound in an amount of from 0.01 to 1 mol % based on the dihalo aromatic compound to dehalogenation and sulfidation reaction at a temperature of from 240°–270° C. in the presence of a water in amount of from 0.5 to 5 mol per 1 kg of an aprotic organic polar solvent until the conversion of the dihalo aromatic compound reaches from 70 to 98 mol %, thereby forming a PAS prepolymer having a melt viscosity of from 5 to 300 poise (as measured at 310° C. under the shear rate of 200 sec$^{-1}$), adding water to the resultant reaction mixture containing the PAS prepolymer so that from 6 to 15 mol of water is present per 1 kg of the solvent, and then continuing the reaction at a temperature of from 240°–290° C., in which the reaction comprising the said two steps is conducted for 1 to 10 hours.

In recent years, thermoplastic resins of higher heat-resistance have been increasingly demanded as a material for the production of electronic equipments and automobile parts.

While PAS has properties capable of satisfying these requirements, it is difficult to obtain PAS typically represented by polyphenylene sulfide of sufficiently high molecular weight and accordingly, there has been a problem that it is very difficult to obtain fibers or films requiring high strength and molded products requiring high impact strength As a typical process for the production of PAS, a process of reacting a dihalo aromatic compound and sodium sulfide in an organic amide solvent such as N-methylpyrrolidone has been disclosed in Japanese Patent Publication No. 45-3368 (U.S. Pat. No. 3354129). However, PAS produced by this proposed method is of a low molecular weight and it is difficult to mold it into molded articles, films, sheets, fiber, etc.

In view of the above situations, various methods of improving the process for producing medium- or high-molecular-weight PAS have been proposed. In the present specification, "low-molecular-weight PAS", "medium-molecular-weight PAS" and "high-molecular-weight PAS" mean those PASs having melt viscosity (as measured at 310° C. under the shear rate of 200 sec$^{-1}$) of not more than about 300 poise, about 300–1000 poise and not less than about 1000 poise respectively.

Among the improved methods, a most typical method as described in Japanese Patent Publication No. 52-12240 (U.S. Pat. No. 3919177) uses an alkali metal organic acid salt as a polymerization aid in the reaction system. According to this method, the polymerization aid has to be added approximately in an equimolar amount to the alkali metal sulfide and, further, it is required to use a large amount of lithium acetate or sodium benzoate which is expensive in order to obtain PAS of high polymerization degree, and accordingly the production cost of PAS is increased, resulting in an industrial disadvantage.

Further, according to this method, a large amount of organic acid, etc are introduced into waste water upon recovery of PAS after the polymerization reaction, thereby possibly causing a problem in view of public pollution in this method and there are serious problems from the economical point of view such as requirement of enormous facilities and much running cost for the recovery and reuse of the organic acid, etc. for prevention of such problems As another method of producing medium- or high-molecular-weight PAS, there has been proposed a method of using a tri- or higher polyhalo aromatic compound as a crosslinking agent or branching agent during polymerization or at the terminal stage of polymerization [Japanese Patent Application Laid Open (KOKAI) No. 53-136100 (U.S. Pat. No. 4116947) etc.].

However, according to this method, although high-molecular-weight PAS having apparent melt viscosity of several tens of thousands poise can be obtained easily, since this PAS is a highly crosslinked or branched polymer, it is poor in the processability, particularly, stretching property and fiber-forming property, and it is difficult to mold into films or fibers. Further, even if molded articles are obtainable, they are mechanically extreme since the molecular chain is basically short In view of the foregoing problems, the present inventors have made an extensive study on the polymerization mechanism of the alkali metal sulfide and dihalo aromatic compound in a simple polymerization system in order to find a process for producing PAS having a sufficiently high melt viscosity, and excellent in the processability and the mechanical property at a reduced cost without using a polymerization aid such as an alkali metal organic acid salt and/or an alkali metal sulfonic acid salt, and as a result, it has been found that a linear PAS of remarkably high molecular weight can be produced without using any polymerization aid by making a significant difference in various polymerization conditions, particularly, the amount of coexistent water and the polymerization temperature between 1st polymerization step (preliminary polymerization step) and 2nd polymerization step (two-phase separated polymerization step) [Japanese patent application Laid Open (KOKAI) No. 61-7332 (U.S. Pat. No. 4,645,826)]

However, in the method of Japanese patent application Laid Open (KOKAI) No. 61-7332, the total polymerization time is still as long as more than 10 hours and the productivity per unit volume of the polymerization reactor is somewhat lower as compared with other general synthetic resins. In view of the above circumstances, the present inventors have further examined the process disclosed in Japanese patent application Laid Open (KOKAI) No. Sho 61-7332 and made an intensive study on the process of shortening the polymerization time and simplifying the process in order to find a method capable of simply producing medium to high-molecular-weight PAS, particularly, medium-molecular-weight PAS in a remarkably shortened time period.

As a result, it has been found that the polymerization time required for obtaining medium to high-molecular-weight PAS can drastically be shortened in the process as described above, particularly, by increasing the polymerization reaction rate at the preliminary polymerization by elevating the reaction temperature, adding a large amount of water at a certain timing before the starting of abnormal reaction (decomposing reaction, etc), causing two-phase separation while elevating the reaction temperature, and continuing the polymerization reaction until the melt viscosity reaches a desired level, but stopping the reaction before the melt viscosity begins decreasing. That is, it has been found that it is important to solve the problem how to control the timing of adding water in the course of the polymerization reaction, and also found that high-molecular-weight PAS can be obtained predominantly by further adding a slight amount of a crosslinking agent, and on the basis of these findings the present invention has been attained.

SUMMARY OF THE INVENTION

In a first aspect of the present invention, there is provided a process for producing a medium-molecular-weight polyarylene sulfide which comprises subjecting an alkali metal sulfide and a dihalo aromatic compound to dehalogenation and sulfidation reaction at a temperature of from 240°–270° C. in the presence of a water in amount of from 0.5 to 5 mol per 1 kg of an aprotic organic polar solvent until the conversion of said dihalo aromatic compound reaches from 70 to 98 mol %, thereby forming a polyarylene sulfide prepolymer having a melt viscosity of from 5 to 300 poise (as measured at 310° C. under a shear rate of 200 $sec^{-1}$, adding water to the resultant reaction mixture containing the polyarylene sulfide prepolymer so that from 6 to 15 mol of water is present per 1 kg of said solvent, and then continuing the reaction at a temperature of from 240°–290° C., in which the reaction comprising said two steps is conducted for from 1 to 10 hours. The different features between the method of the present invention and that of U.S. Pat. No. 4,645,826 are that the peak of the molecular weight of the polymer is attained much sooner in the former than in the latter, that the maximum molecular weight attained then is as high as the medium one in the former method without using any polymerization aid, and that the molecular weight readily tends to start decreasing if the polymerization time prolonged beyond the peak time.

In a second aspect of the present invention, there is provided a process for producing a high-molecular-weight polyarylene sulfide which comprises subjecting an alkali metal sulfide, a dihalo aromatic compound and a tri- or higher polyhalo aromatic compound in an amount of from 0.01 to 1 mol % based on the dihalo aromatic compound to dehalogenation and sulfidation reaction at a temperature of from 240°–270° C. in the presence of a water in amount of from 0.5 to 5 mol per 1 kg of an aprotic organic polar solvent until the conversion of said dihalo aromatic compound reaches to 70–98 mol %, thereby forming a polyarylene sulfide prepolymer having a melt viscosity of from 5 to 300 poise (as measured at 310° C. under a shear rate of 200 $sec^{-1}$), adding water to the resultant reaction mixture containing the polyarylene sulfide prepolymer so that from 6 to 15 mol of water is present per 1 kg of said solvent, and then continuing the reaction at a temperature of from 240°–290° C., in which the reaction comprising said two steps is conducted for from 1 to 10 hours. The difference from the first aspect is in where crosslinking agents are employed and where a high-molecular-weight polymer can be attained.

DETAILED DESCRIPTION OF THE INVENTION

The present invention relates to a polymerization process for producing medium to high-molecular-weight PAS in a time as short as possible, which is developed from the process as described in U.S. Pat. No. 4,645,826.

Production of PAS

The production process for PAS according to the present invention comprises conducting the reaction between an alkali metal sulfide and a dihalo aromatic compound under specific conditions.

Alkali Metal Sulfide

The alkali metal sulfide to be used in the present invention can include lithium sulfide, sodium sulfide, potassium sulfide, rubidium sulfide, cesium sulfide and mixture thereof. Needless to say, alkali metal sulfides produced in situ are included. These alkali metal sulfides may be used as hydrates, aqueous mixtures or in anhydrous forms.

Among the alkali metal sulfides, sodium sulfide is most inexpensive and industrially preferred.

A small amount of alkali metal alkoxides and/or hydroxides may be used together for reacting with alkali metal bisulfides or alkali metal thiosulfates which may possibly be present in a slight amount in the alkali metal sulfide, thereby removing these impurities or converting them into harmless substance.

Dihalo aromatic compound

The dihalo aromatic compound to be used in the present invention can include, for example, those dihalo aromatic compounds as described in Japanese Patent Application Laid Open (KOKAI) No. 59-22926 (U.S. Pat. No. 4495322). Particularly preferred are p-dichlorobenzene, m-dichlorobenzene, 2,5-dichlorotoluene, p-dibromobenzene, 1,4-dichloro-naphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone, 4,4'-dichlorodiphenyl sulfoxide and 4,4'-dichlorodiphenyl ketone. Among all, those containing para-dihalobenzene, typically p-dichlorobenzene as the main ingredient are particularly preferred.

By appropriate selection and combination of diharo aromatic compounds, a copolymer containing two or more of different reaction units can be obtained. For instance, a copolymer comprising the repeating unit of:

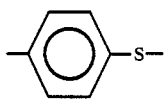

and the repeating unit of:

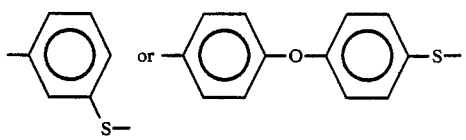

can be obtained by using p-dichlorobenzene in combination with m-dichlorobenzene or 4,4'-dichlorodiphenyl ether. The copolymer may be a block copolymer as well as a random copolymer.

While the PAS according to the present invention is a polymer of the dihalo aromatic compound as described above, it is also possible to use a monohalo compound (not always necessarily be an aromatic compound) in combination with the dihalo aromatic compound in order to form the terminal end of the resultant polymer, or control the polymerization reaction or molecular weight.

In the present invention, tri- or higher polyhalo aromatic compound may be used together for forming a branched or crosslinked polymer. Concrete example for a case where the monohalo or polyhalo compound is an aromatic compound will be apparent to those skilled in the art as a derivative of the monohalo or polyhalo derivative of the specific examples described above. According to the process of the present invention, a medium-molecular-weight PAS can predominantly be obtained in the case of not using the polyhalo compound, as mentioned before. While on the other hand, by using a polyhalo compound, for example, trichlorobenzene in such a small amount as not causing remarkable degradation in the processability in combination with dichlorobenzene, a high-molecular-weight phenylene sulfide polymer can predominantly be obtained. In order to form a fiber or film, it is preferred for PAS to be less branching or crosslinking.

Accordingly, the amount of the crosslinking agent used in the case of predominantly obtaining a high-molecular-weight PAS is, preferably, within a range from 0.01 to 1 mol % and, particularly preferably, from 0.03 to 0.5 mol % of the crosslinking agent based on the dihalo aromatic compound in view of the processability, in a case where the crosslinking agent is trihalo or higher polyhalo aromatic compound.

Polymerization solvent

As the aprotic organic polar solvent to be used in the polymerization reaction according to the present invention, organic amides including carbamic acid amide derivatives, such as N-methylpyrrolidone (NMP), N-ethylpyrrolidone, N,N-dimethylformamide, N,N-dimethylacetoamide, N-methylcaprolactam, tetramethyl urea, dimethylimidazoline, hexamethyl phosphoric acid triamide, and mixtures thereof may be exemplified. Among them, N-methylpyrrolidone is particularly preferred.

The amount of the organic polar solvent used is preferably within a range of from 0.3 to 5 kg, more preferably from 0.4 to 2 kg and, most preferably from 0.5 to 2 kg based on one mol of the alkali metal sulfide.

Reaction apparatus

Various steps in the polymerizing process according to the present invention, among all, the dehydration step usually conducted for the control of water content before the beginning of the polymerization reaction and the preliminary polymerization step are preferably conducted by using a reaction apparatus in which at least those parts in contact with the reaction solution are constituted with titanium material That is, since the first polymerization step (preliminary polymerization step) is conducted at a higher temperature as compared with the method described in Japanese patent application Laid Open (KOKAI) No. 61-7332 (U.S. Pat. No. 4,645,826 ), decomposition reaction tends to occur more liably but the decomposition reaction can remarkably be decreased by using a reaction apparatus in which at least the parts in contact with the reaction solution are constituted with titanium material Polymerization The polymerization according to the present invention is conducted in at least two stages, i.e. at least two steps which are different with respect to the reaction temperature of the polymerization reaction system and the amount of water present in the polymerization reaction system. In this specification "at least two steps" means that auxiliary steps may be added before, during or after the two steps so long as the effect of the present invention due to the combination of the two steps can be attained. For example, a polymerization conducted in a multi-stage so that the heat of polymerization can easily be removed at the initial stage of the polymerization or a polymerization conducted continuously in the preliminary polymerization step, are exemplified.

(1) Preliminary polymerization step

In the first step, that is, in the preliminary polymerization step in the present invention, polymerization is conducted in a polymerization reaction system containing from 0.5 to 5 mol of water per 1 kg of an aprotic organic polar solvent at a temperature of from 240°–270° C. until the conversion of the dihalo aromatic compound in the polymerization reaction system reaches 70 to 98 mol %, thereby obtaining the resultant PAS prepolymer having a melt viscosity of from 5 to 300 poise (the melt viscosity in the present invention is measured at 310° C. under the shear rate of 200 sec$^{-1}$)

The feature of the preliminary polymerization step is that the polymerization temperature is as high as above 240° C. for increasing the reaction rate. In such a high temperature, if a large amount of water and alkali metal sulfide are present together in the polymerization reaction system, decomposition reaction is liable to occur. In order to avoid the decomposition reaction, it is preferred that the water content in the reaction system is somewhat lower in the present invention as compared with the method described in Japanese patent application Laid Open (KOKAI) No. 61-7332 (U.S. Pat. No. 4,645,826). That is, the preliminary polymerization can be conducted at a high reaction rate under a high temperature while preventing the decomposition reaction by properly reducing the amount of water present together in the reaction system.

However, if the polymerization is continued in this state, the dihalo aromatic compound in the polymerization reaction system is rapidly consumed and, since the amount thereof is decreased, abnormal reaction such as decomposition reaction becomes liable to occur. Then, it is necessary to pay attention to the progress of the polymerization so that the conversion does not exceed 98 mol %, where the abnormal reaction is liable to occur. That is, it is important that the preliminary polymerization step is changed to the second step, that is, to the two-phase separated polymerization step before the conversion exceeds 98 mol %.

Upon practicing the preliminary polymerization, polymerization reaction is at first carried out by adding an alkali metal sulfide and a dihalo aromatic compound into an organic polar solvent, preferably, in an inert gas atmosphere and elevating the temperature to a predetermined level.

If the water content of the alkali metal sulfide is in excess of a predetermined amount, unrequired amount of water is subjected to dehydration before the addition of the dihalo aromatic compound by the method known to those skilled in the art, that is, by raising the temperature of the solvent (containing alkali metal sulfide),to a temperature of about 150° C. to 210° C. under a normal pressure. In this case, if water has been eliminated excessively, insufficient content may be supplemented by a further addition. Preferred amount of water to be present together in the polymerization reaction system is extremely low and it is from 0.5 to 5 mol, preferably from 0.6 to 4 mol, and more preferably from 1 to 2.4 mol per 1 kg of the solvent for use in polymerization. If the amount of water is not more than 0.5 mol, undesirable reaction such as decomposition or denaturation of the resultant PAS tends to occur, whereas if the water content exceeds 5 mol, the polymerization reaction system also tends to cause decomposition and both of the cases are not preferable.

The preliminary polymerization is carried out at a temperature of from 240° to 270° C. If the temperature is lower than 240° C., it takes a long polymerization time. While on the other hand, if it exceeds 270° C., the resultant PAS or the solvent tends to cause decomposition and both of the cases are not preferable.

The amount of the dihalo aromatic compound used is within a range of from 0.95 to 1.1 mol per one mol of the alkali metal sulfide and, particularly, the amount within a range of from 0.98 mol to 1.05 mol is preferred for obtaining an objective medium- to high-molecular-weight PAS. If it is less than 0.95 mol, decomposition reaction tends to occur readily. On the other hand, if it exceeds 1.1 mol, it is difficult to obtain an objective PAS having a melt viscosity suitable to the fabrication and both of the cases are not preferable.

The terminal point of the preliminary polymerization, that is, the point at which the polymerization is changed from the preliminary polymerization to the two-phase separated polymerization by adding water to the reaction system is the point at which the conversion of the dihalo aromatic compound in the polymerization reaction system reaches 70 to 98 mol %. If the conversion is less than 70 mol %, undesirable reaction such as decomposition may occur in the two-phase separated polymerization On the other hand, if the conversion exceeds 98 mol %, it may cause decomposition or denaturalation of the polymer and it is difficult to obtain an objective PAS of medium to high polymerization degree even after the two-phase separated polymerization. The conversion of from 80 to 98 mol %, more preferably from 90 to 98 mol % is more suitable since PAS of a desired polymerization degree can be obtained stably within a short time.

The conversion of the dihalo aromatic compound is calculated according to the following formula:

(a) In the case of adding the dihalo aromatic compound (simply referred to as DHA) at a molar ratio in excess of the alkali metal sulfide:

Conversion =

$$\frac{\text{DHA charged (moles)} - \text{Residual DHA (moles)}}{\text{DHA charged (moles)} - \text{Excessive DHA (moles)}} \times 100$$

(b) In other cases than (a) above:

Conversion =

$$\frac{\text{DHA charged (moles)} - \text{Residual DHA (moles)}}{\text{DHA charged (moles)}} \times 100$$

Then, it is also important to judge the point of the change over from the preliminary polymerization to the two-phase separated polymerization not only by the conversion but also by the range of the melt viscosity of the resultant prepolymer.

That is, the melt viscosity of the resultant prepolymer should be from 5 to 300 poise, preferably from 5 to 200 poise, which is suitable for obtaining a medium- to high-molecular-weight PAS. If the melt viscosity is less than 5 poise, decomposition or reduction in the reaction rate tends to occur in the two-phase separated polymerization step. On the other hand, if the melt viscosity exceeds 300 poise, the polymerization reaction product tends to be decomposed, or the growth of the resultant prepolymer becomes difficult in the two-phase separated polymerization step.

Since the reaction rate is high in the reaction system where the temperature is high and water content is low as in the preliminary polymerization system of the present invention, it is extremely important to properly conduct the change over to the two-phase separated polymerization step. While the optimum range for the preliminary polymerization time varies depending on the molar ratio between the dihalo aromatic compound and the alkali metal sulfide, polymerization temperature, water content, etc., it is preferably from about 1 to 4 hours, more preferably 1 to 3 hours.

(2) Two-phase separated polymerization step

In the second step, that is, in the two-phase separated polymerization step of the present invention, a large amount of water is added at an appropriate timing to the slurry of the preliminary polymerization to adjust the total water content in the polymerization reaction system to 6–15 mol per 1 kg of the solvent for use in the polymerization, the temperature is controlled within a range of from 240° to 290° C., thereby causing the liquid-liquid two-phase separated state (a liquid phase rich in the polymer and another liquid phase poor in the polymer), and the polymerization is continued while maintaining the temperature of the reaction system within the range as described above. If the total water content in the polymerization reaction system is less than 6 mol, the two-phase separation becomes insufficient and the decomposition reaction tends to occur. While on the other hand, if the total water content exceeds 15 mol, it is also difficult to obtain a high-molecular-weight PAS. Particularly, if the two-phase separated polymerization is carried out with the total water content in a range of from 6 mol to 12 mol, preferably from 6 to 10 mol, PAS of high melt viscosity can be easily obtained.

While on the other hand, the two-phase separation is carried out at a temperature of from 240° to 290° C., preferably from 245° to 280° C. under the water content condition as described above. If the temperature of the reaction system is lower than 240° C., it is difficult to obtain medium- or high-molecular-weight PAS. While on the other hand, if the temperature exceeds 290° C., the solvent or resultant polymer tends to be decomposed readily and both of the cases are not preferable. Particularly, a temperature in a range of from 250° to 270° C. is preferred for obtaining medium to high-molecular-weight PAS.

For obtaining PAS suitable to general application use, the polymerization is preferred to be continued until an objective medium to high-molecular-weight PAS is formed, but to be discontinued before the decreasing of the molecular weight becomes vigorous. Further, for obtaining the resultant PAS in the form of particles of good handlability, it is preferred to continue the polymerization until the melt viscosity increases to 5 times or more of the prepolymer. The polymerization time required in the two-phase separated polymerization varies depending on the conditions such as the melt viscosity of the prepolymer, temperature for the two-phase separated polymerization, amount of water coexistent in the two-phase separated polymerization step, desired melt viscosity of the polymer, etc., and a polymerization time within a range of from 0.5 to 5 hours, preferably from 1 to 4 hours is usually preferred. If the polymerization time is too short, it is difficult to obtain a medium- to high-molecular-weight polymer and also to control the termination of the polymerization reaction. While on the other hand, if the polymerization time is prolonged excessively, side-reaction such as depolymerization and/or decomposition tend to become vigorous and besides, the polymerization for a long time is not also preferred from the economical point of view, because the peak of the molecular weight is attained rather in a short polymerization period.

It is a feature of the process according to the present invention that the sum of the polymerization time required for the preliminary polymerization and the two-phase separated polymerization is as short as within a range of from 1 to 10 hours, preferably about from 2 to 6 hours.

The reaction vessel used for the preliminary polymerization and the reaction vessel used for the two-phase separated polymerization may be identical or different.

(3) Recovery Step

The resultant polymer and the solvent in the polymerizing process according to the present invention can be recovered by the ordinary method. That is, after the completion of the two-phase separated polymerization reaction, the cooled resultant slurry is filtered as it is, or filtered after being diluted with an organic solvent or water, if necessary, washed with an acidic aqueous solution, and then further washed with water repeatedly followed by drying, thereby enabling to obtain an objective PAS.

Properties and Uses of PAS according to the Present Invention

Molded products of much great impact strength or flexural strength can be obtained at an inexpensive cost from medium- or high-molecular-weight PAS formed by the process according to the present invention. Further films, fibers, etc. can also be obtained.

PAS formed according to the present invention can be used as a composition mixed with at least one of synthetic resins such as polyphenylene sulfide copolymer, poly m-phenylene sulfide, poly-p-phenylene sulfide of low polymerization degree, polyether ether ketone, polyether sulfone, polysulfone, polyimide, polyamide, polyphenylene ether, polyarylene, polycarbonate, polyacetal, crystalline or amorphous polyester, fluoro resin, polystyrene, polyolefin and ABS, or elastomers such as olefin rubber, fluoro rubber, silicone rubber, butyl rubber and hydrogenated SBR rubber.

Furthermore, the PAS formed according to the present invention can also be used as a composition mixed with at least one of fiberous fillers such as carbon fibers, glass fibers, calcium silicate fibers, potassium titanate fibers, silica fibers, calcium sulfate fibers and asbestos, or powdery filters such as mica, silica powder, alumina powder, titanium oxide powder, calcium carbonate powder, talc, clay, glass powder, calcium silicate powder and calcium sulfate powder.

In the process according to the present invention since the time for the preliminary polymerization reaction is significantly shortened, it is possible to save or reduce the porcedures, labors and times in the production of medium- to high-molecular-weight PAS, which enables to significantly reduce the production cost.

The present invention is explained in more detail in the following Examples; however, it should be recognized that the scope of the present invention is not restricted to these Examples.

EXAMPLE 1

Into a one liter autoclave lined with titanium, 5.0 mol of N-methyl pyrrolidone (hereinafter simply referred to as NMP) and 1.00 mol of hydrous $Na_2S$ (solid content: 45.96%) were charged and a temperature was gradually elevated to about 205° C. under $N_2$ gas stream while stirring to distill out 4.36 mol of water, 0.1 mol of NMP and 0.03 mol of $H_2S$ ($Na_2S$ effective charged amount=0.97 mol, total water content/NMP=1.7 (mol/kg)). After cooling to about 140° C., p-dichlorobenzene (hereinafter simply referred to as p-DCB) was charged thereto so as to be 1.02 (mol/mol) based on the effective amount of $Na_2S$ charged, and polymerization (preliminary polymerization) was conducted while stirring at 250° C./2.0 hours. The melt viscosity of the resultant prepolymer was 50 poise (measured at 310° C. under the shear rate of 200 $sec^{-1}$) and the conversion was 92.6 mol % in the preliminary polymerization.

Water was immediately added to the system to control the total water content/NMP=10.0 (mol/kg), and while stirring, the temperature was elevated to 260° C. and polymerization (two-phase separated polymerization) was conducted at 260° C./3.0 hours.

After the completion of the reaction, the stirring was immediately stopped. After cooling, the reaction slurry was recovered and only the polymer (particles) were collected by sieving using a screen with mesh size of 0.1 mm, which were washed several times with water and dried at 100° C. under a reduced pressure.

The thus obtained polymer was in a fine particulate form [yield=83% and melt viscosity=550 poise (measured at 310° C. under the shear rate of 200 sec$^{-1}$)]. The conversion in the preliminary polymerization was measured by the gas chromatography analysis for residual p-DCB in the sampled slurry. Further, the melt viscosity of the resultant polymer in the preliminary polymerization was measured for the sampled slurry applied with suction filtration, re-slurryfication of the solid component in acetone, washing with water, washing with acetone and then drying at 100° C. under a reduced pressure.

The melt viscosity in the present invention was determined for all of the sampled polymer, by molding them into a sheet of 0.2–0.3 mm thickness by pressing at 320° C./30 sec using a hot press, and measuring by a KOKA type flow tester (nozzle:0.5 ml$\phi$×100 mmL) at 310° C. and determining the value corresponding to the shear rate=200 sec$^{-1}$.

EXAMPLES 2-15

Polymerization was conducted in the same procedures as in Example 1 while varying the conditions for the preliminary polymerization and the two-phase separated polymerization. The polymerization conditions and the properties of the resultant polymer are collectively shown in Table 1.

PASs obtained by polymeization while adding a cross-linking agent in Examples 13 and 14 were subjected to stretching treatment for the estimation of processability. That is, both of the polymers were molded each into a sheet of 0.2 mm thickness by pressing at 320° C. using a hot press, the obtained sheets were cut-out into a rectangular piece of 10 mm width and each piece thus obtained was stretched at 102° C. by using a Tensilon tester. As a result, the sheet from the polymer of Example 13 could be stretched by more than four times to obtain a sufficiently oriented film. While on the other hand, the sheet obtained from the polymer of Example 14 was broken at the stretching rate of less than 1.5 times failing to give a sufficiently oriented film. In Example 15, the obtained reaction slurry was more viscous than that of Example 1 and emitting slightly a thiophenol-like smell owing to decomposition. As for the molecular weight growing, it was evident that the time of the peak of the molecular weight was passed and that the decreasing of it had begun.

TABLE 1

| No. | p-DCB / Na₂S | Preliminary polymerization Polymerization temp. (°C.) | Polymerization time (Hr) | Water in system (*1) | Resultant polymer η* (poise) | Conversion (Mol %) | Two-phase separated polymerization Polymerization temp. (°C.) | Polymerization time (Hr) | Water in system (*1) | Resultant polymer η* (poise) | Polymer yield (Mol %) | Growing ratio (*2) | Remark |
|---|---|---|---|---|---|---|---|---|---|---|---|---|---|
| 1 | 1.02 | 250 | 2.0 | 1.7 | 50 | 92.6 | 260 | 3.0 | 10.0 | 550 | 83 | 11 | T = 5.0 (*3) |
| 2 | 1.02 | 260 | 2.0 | 2.7 | 80 | 93.0 | 260 | 3.0 | 7.8 | 460 | 75 | 6 | T = 5.0 |
| 3 | 1.015 | 240 | 2.3 | 2.2 | 70 | 91.0 | 260 | 2.7 | 7.8 | 930 | 83 | 13 | T = 5.0 |
| 4 | 1.015 | 250 | 2.3 | 2.2 | 80 | 94.3 | 250 | 2.7 | 7.8 | 550 | 84 | 7 | T = 5.0 |
| 5 | 1.02 | 250 | 1.5 | 1.6 | 80 | 91.6 | 260 | 3.0 | 7.8 | 530 | 83 | 13 | T = 4.5 |
| 6 | 1.02 | 250 | 1.5 | 2.4 | 40 | 92.4 | 250 | 2.5 | 7.8 | 420 | 83 | 14 | T = 4.0 |
| 7 | 1.03 | 220 | 3.0 | 2.2 | <5 | 47.5 | 260 | 3.0 | 10.0 | — | — | — | Decomposition (Preliminary polymerization at lower temperature) (Comparative Example) |
| 8 | 1.02 | 295 | 2.0 | 2.0 | — | — | — | — | — | — | — | — | Decomposition (preliminary polymerization at high temperature) (Comparative Example) |
| 9 | 1.02 | 250 | 0.5 | 2.2 | <5 | 48.0 | 260 | 3.0 | 10.0 | — | — | — | Decomposition (lower viscosity and lower conversion at preliminary polymerization) (Comparative Example) |
| 10 | 1.02 | 260 | 2.0 | 0.24 | — | — | — | — | — | — | — | — | Decomposition (water insufficient in preliminary polymerization) (Comparative Example) |
| 11 | 1.02 | 260 | 2.0 | 6.4 | — | — | — | — | — | — | — | — | Decomposition (water excessive in preliminary polymerization) (Comparative Example) |
| 12 | 1.02 | 260 | 2.0 | 2.7 | 80 | 93.3 | 260 | 2.0 | 2.7 | 70 | 98 | <1 | Slight decomposition (no addition of water) (Conventional polymerization) (Comparative Example) |
| 13 | 1.03 | 250 | 2.0 | 2.2 | 80 | 91.4 | 260 | 3.0 | 7.8 | 2600 | 81 | 33 | 0.16 mol of 1,3,5-trichlorobenzene added T = 5.0 |
| 14 | 1.03 | 250 | 2.0 | 2.2 | 260 | 92.5 | 260 | 3.0 | 7.8 | >30,000 | 83 | >115 | 1.1 mol of 1,3,5-trichlorobenzene added T = 5.0 (Comparative Example) |
| 15 | 1.02 | 250 | 2.0 | 1.7 | 50 | 92.6 | 260 | 10.0 | 10.0 | 220 | 70 | 4 | T = 12.0 Slight decomposition Too long polymerization (Comparative Example) |

(*1) Total water content/solvent for polymerization (mol/kg)
(*2) Growing ratio of melt viscosity of the resultant polymer in the two-phase separated polymerization, i.e., melt viscosity of polymer in the two-phase separated polymerization/melt viscosity of polymer in the preliminary polymerization (poise/poise)
(*3) T = time for two-phase separated polymerization + time for preliminary polymerization (Hr).

What is claimed is:

1. A process for producing polyarylene sulfide having a melt viscosity of from 300 to 1,000 poise, as measured at 310° C. under a shear rate of 200 sec$^{-1}$, which comprises subjecting an alkali metal sulfide and a dihaloaromatic compound to dehalogenation and sulfidation reaction at a temperature of from 240° to 270° C. in the presence of water in an amount of from 0.5 to 5 mole per 1 kg of an aprotic organic polar solvent until the conversion of said dihaloaromatic compound in the polymerization system reaches from 70 to 98 mole %, thereby forming a polyarylene sulfide prepolymer having a melt viscosity of from 5 to 300 poise, as measured at 310° C. under a shear rate of 200 sec$^{-1}$, adding water to the resultant reaction mixture containing the polyarylene sulfide prepolymer so that from 6 to 15 mole of water is present per 1 kg of said solvent, and then continuing the reaction at a temperature of from 240° to 290° C., in which the reaction comprising said two steps is conducted for from 2 to 6 hours, and wherein said reaction is conducted in a reaction apparatus in which at least the parts in contact with the reaction solution are constituted with titanium material.

2. The process for producing the polyarylene sulfide according to claim 1, wherein the amount of solvent used is within a range of from 0.3 to 5 kg per mole of charged alkali metal sulfide.

3. The process for producing a polyarylene sulfide according to claim 1, wherein the polyarylene sulfide is a polymer comprising the repeating unit:

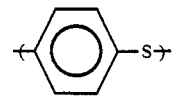

as the main ingredient.

* * * * *